(No Model.) 2 Sheets—Sheet 1.

C. M. BUMP.
FILTER.

No. 541,342. Patented June 18, 1895.

Witnesses: Inventor.

(No Model.) 2 Sheets—Sheet 2.
C. M. BUMP.
FILTER.

No. 541,342. Patented June 18, 1895.

Witnesses: Inventor.
John A. Gregg Charles M. Bump
John R. Glover

UNITED STATES PATENT OFFICE.

CHARLES M. BUMP, OF BAY CITY, MICHIGAN.

FILTER.

SPECIFICATION forming part of Letters Patent No. 541,342, dated June 18, 1895.

Application filed March 18, 1895. Serial No. 542,233. (No model.)

*To all whom it may concern:*

Be it known that I, CHARLES M. BUMP, a citizen of the United States, residing at Bay City, in the county of Bay and State of Michigan, have invented certain new and useful Improvements in Filters; and I do hereby declare the following to be a full, clear, and exact description of the invention, such as will enable others skilled in the art to which it appertains to make and use the same.

My invention relates to an improvement in filters and it consists in a chamber to which the water pipe is connected, and which is divided vertically by means of a partition combined with a chamber that is bent back and forth and provided with a removable cap, and which is removably connected to the inlet chamber, the chambers being filled with any suitable filtering material as will be more fully described hereinafter.

The objects of my invention are to construct a filter which can be attached directly to the pipes of the water works of a city; and to form the filter of two parts, and to detachably connect these parts together so that they can be reversed in their relation to each other, and to reverse the flow of water so as to cleanse the filtering material; and to provide one of the portions of the filter with a removable return bend so that access can be had at any time to the filtering material.

Figure 1:
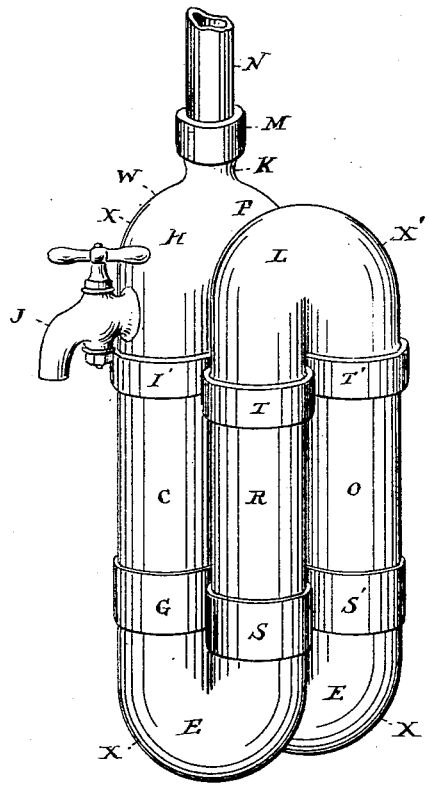
Figures 2, 3:
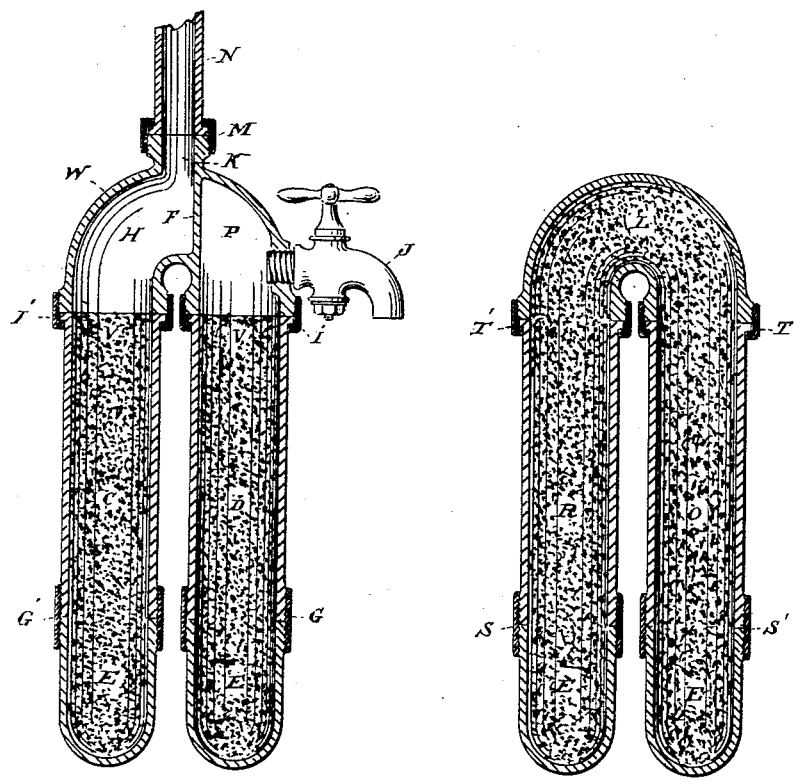

In the accompanying drawings, Figure 1 is a perspective view of a filter which embodies my invention. Fig. 2 is a vertical section through Fig. 1 upon the line X X. Fig. 3 is a vertical section taken through Fig. 1 at X' X'.

K represents the inlet pipe which is adapted to be connected by any suitable coupling with the pipe N, shown broken off at the top, connected to the water works of the city.

The short pipe K forms a part of the chamber H, which is divided vertically by the partition F, into two parts, the larger chamber H, being filled with sponge to catch any large particles which may be in the water, while the smaller chamber P, to which the cock J is attached may be left without any filtering material at all and used only to collect a quantity of water that has passed through the filtering material, and which is held ready to be drawn off for drinking purposes.

The chambers H and P are formed in a return bend which is just long enough to receive suitable unions by means of which the parts are connected to the chambers C and D. The chambers C and D are provided with a return bend E, connected by couplings G and G' whereby the doubled up portions R and O, are connected by couplings S and S', provided on their upper end with a return bend L, secured by unions T, T, which gives ready access not only to the filtering material but to enable the filter to be readily packed with gravel, charcoal, sand or any other suitable filtering materials that may be preferred.

Between the chambers H. C. and P. D, at the point where they are connected by the unions I and I', suitable screens, V and V' are placed both for the purpose of separating the filtering materials and to hold them in position against the action of the water. The cap W being connected by unions to the chambers C and D corresponding exactly in size and shape, may be removed at any time and reversed in position upon C. and D. and thus the flow of water to the filter reversed for the purpose of washing out the filtering material.

By doubling the chambers back and forth upon themselves as shown, a large amount of filtering surface is condensed into a very small space, and a very compact filter is produced, and one which is adapted to have either a continuous stream of water flowing through it, or which can be used to draw off small quantities for drinking purposes only, as may be desired.

Having thus described my invention, I claim—

In a filter, the return bend W provided with an inlet pipe, and a vertical partition Y, and which has formed upon its bottom unions I. I. combined with the pipe sections C. D. R. and O. connected to the parts by the couplings E. E. and L. with the removable cap piece and the faucet for drawing off the water from the chamber P. formed in the return bend W., substantially as shown and described.

In testimony whereof I affix my signature in the presence of two witnesses.

CHAS. M. BUMP.

Witnesses:
JOHN A. GREGG,
JOHN R. GLOVER.